April 16, 1963 T. B. MARTIN 3,085,427
DYNAMOMETER

Filed Jan. 23, 1961 3 Sheets-Sheet 1

INVENTOR
Thomas B. Martin
BY
*Julian Cyplan*
*attorney*

April 16, 1963 T. B. MARTIN 3,085,427
DYNAMOMETER

Filed Jan. 23, 1961 3 Sheets-Sheet 2

INVENTOR
Thomas B. Martin
BY *Julian Caplan*
attorney

April 16, 1963

T. B. MARTIN 3,085,427

DYNAMOMETER

Filed Jan. 23, 1961

INVENTOR

Thomas B. Martin

BY

*Julian Caplan* attorney

United States Patent Office 3,085,427
Patented Apr. 16, 1963

3,085,427
DYNAMOMETER
Thomas B. Martin, P.O. Box 392, Danville, Calif.
Filed Jan. 23, 1961, Ser. No. 84,242
13 Claims. (Cl. 73—136)

This invention relates to a new and improved dynamometer and more particularly to that type which can be read while the device is rotating and preferably is read with a stroboscope having a tachometer so that the speed of the device as well as its torque may be read at the same time.

Essentially the device hereinafter described in detail comprises a driving element which is connected to a shaft for example, preferably by a collet and a driven element which is connected as by means of a belt to the device to be driven and which is characterized by the fact that it has a spring interposed between the driving and driven elements which is attached at its center to the driving element and thereby balances out centrifugal force.

Still another feature of the invention is the fact that the strain of starting and stopping is reduced by providing a dampening connection between the driving and driven parts. For example, a dashpot effect may be incorporated in the device to overcome the effect of initial starting transients.

A feature and advantage of the present invention is the fact that it may be so constructed that it will fit a wide range of motor shaft sizes and it therefore is not limited to one particular size. As hereinafter described, a collet is used to attach the driving element to the shaft and such collet may be changed for different shaft sizes.

Still another feature of the invention is the fact that it may be connected to the driven element by various means including a driving pulley and the present invention provides its own adjustment as to the diameter of the driving pulley. On the other hand, the dynamometer is adaptable to various situations depending upon the equipment that is to be tested and may be adapted by means herein illustrated and which will readily occur to those skilled in this art, to pulleys, sprockets, gears and also to direct drive of the driven element.

A still further feature of the invention is the fact that it may be applied to equipment in the field and it is not necessary to bring the equipment to be tested to a laboratory. The dynamometer is small in size and low in cost and readily transported.

A still further feature of the invention is that no separate source of power, such as electric power, is required and that no separate power absorbing device is required.

A still further feature of the invention is the fact that its zero adjustment may be readily accomplished. Further, the device may be calibrated by merely shortening or lengthening the effective length of the spring heretofore described at both ends. Such adjustment is easily and rapidly accomplished.

A still further feature of the invention is the fact that it reads torque in either direction of rotation.

Still another feature of the invention is the fact that it is protected by internal stops against overload and that the stop has a dashpot action for surges or transients in load.

Another feature of the invention is the fact that all sensitive indicating elements are isolated from shock load by reason of the use of the internal stops hereinabove mentioned. Thus damage to such elements is reduced.

Other objects of the present invention will become apparent upon reading the following specification and referring to the accompanying drawings in which similar characters of reference represent corresponding parts in each of the several views.

Figure 1:
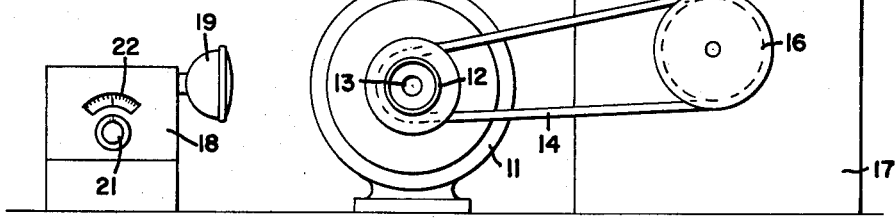
FIG. 1 is a schematic side elevational view showing the dynamometer, a stroboscopic tachometer, motor and load.

As shown in FIG. 1, the device may be installed for testing the torque supplied by a motor 11 having the dynamometer 12 connected to its shaft 13 and being in turn connected by means of belt 14 to pulley 16 on a load 17 under test, such as a fan. Located to one side of the device is a stroboscope 18 having a stroboscopic beam producing means 19 directed toward the dynamometer and also having incorporated therein a speed control 21 and, optionally, a tachometer 22 indicating the revolutions per minute of the shaft 13 when the stroboscope is properly adjusted for such speed by means of control 21.

Figure 2:
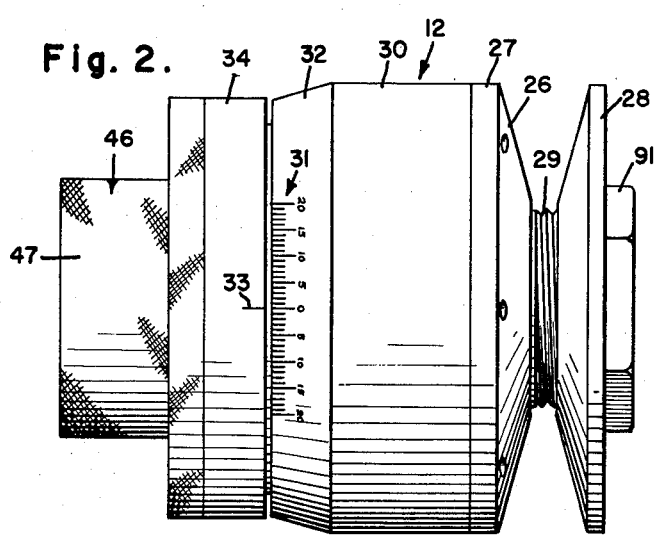
FIG. 2 is a side elevation of the dynamometer.

FIG. 2 illustrates the exterior of the device, the external parts at the left-hand end being fixed for rotation with the driving shaft of the motor and the parts to the right-hand end being fixed for rotation with the driven device. As is shown, a pulley for a V-belt is provided by means of the slanted side 26 of the end 27 of the casing 30 and the adjacent plate 28 which also has a slanted side. The distance between side 26 and plate 28 may be adjusted by turning the threaded plate 28 on threaded end 29 of side 26. It is important to note that a scale 31 having readings to either side of the zero point is applied to the beveled opposite end 32 of casing 30. At the same time, a pointer indicator line 33 which cooperates with the scale is formed on zero adjustment nut 34. When the dynamometer is rotating and when the stroboscope 18 is adjusted for the speed of rotation, a visual reading of pointer 33 relative to scale 31 may be obtained and this is calibrated to give the torque produced by motor 11. Stroboscope 18 may optionally give a reading of the speed of rotation of shaft 13, or a separate tachometer may be used.

Figure 3:
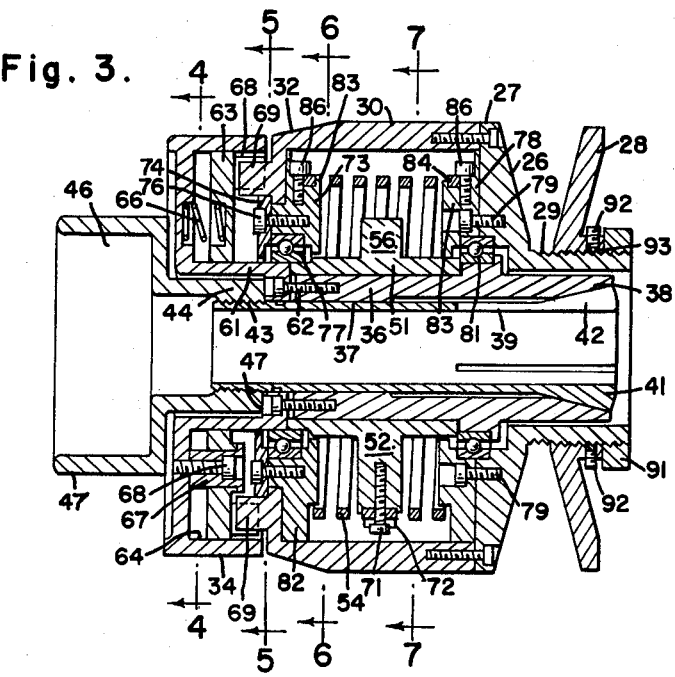
FIG. 3 is a longitudinal sectional view.

Internally of the device is inner sleeve 36 having a bore 37 at its left end and having at its right end an outward internal taper 38, as viewed in FIG. 3. Within sleeve 36 is collet 39 which fits into bore 37 and which has an outwardly externally tapered end 41 which engages taper 38. As is well understood in the machinery art, collet 39 is formed with slots 42 at its outer end and allowing the collet to be compressed into tight engagement with a shaft which extends through the center of the collet. The left-hand end 43 of collet as viewed in FIG. 3 is threaded and receives the inner reduced diameter threaded portion 44 of collet nut 46. Collet nut 46 has an enlarged diameter gripping surface 47 which may be turned and since the inner end 44 of the nut bears against stationary abutment 47 on nut 34 which in turn is secured to the end of sleeve 36, the collet 39 may be moved toward and away from the sleeve 36, thereby compressing and expanding the collet. It will further be understood that the collet 39 is interchangeable for various shaft diameter sizes.

Figure 7:
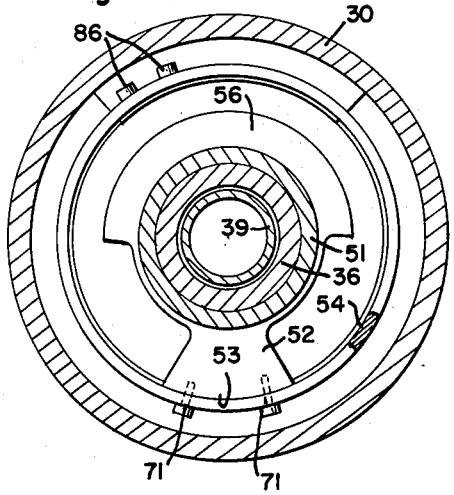

Surrounding inner sleeve 36 is outer sleeve 51 shown in detail in FIG. 7. Projecting radially outwardly from sleeve 51 is spring engaging arm 52 which has an arcuate outer edge 53 attached to the spring 54, hereinafter described in detail. A counterweight 56 projects out from outer sleeve 51 opposite arm 52 so that the inner sleeve is dynamically balanced.

Zero adjustment nut 34 has an inwardly directed neck 61 which fits immediately around the inner end 44 of collet nut 46 and contains at its inner end an internal collar 47, the abutment for collet nut 46, and the inner surface of which is in frictional gripping arrangement with the left end of outer sleeve 51. Collar 47 is connected to inner sleeve 36 by screws 62. When screws 62 are loosened, the frictional connection between the contacting surfaces of zero adjustment nut neck 47 and outer sleeve 51 is relaxed, permitting the zero adjustment nut 34 to be turned relative to outer collar 51 until the zero pointer 33 is properly positioned relative to scale 31. When the screws 62 are tightened, the parts are locked in position so that collet 39, nut 46, inner sleeve 36, outer sleeve 51 and zero adjusting nut 34 turn together with shaft 13.

Figure 4:
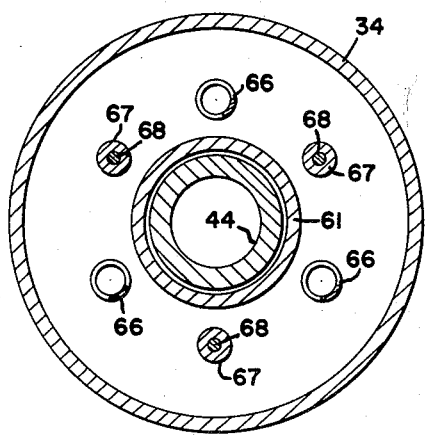
FIGS. 4, 5, 6 and 7 are, respectively, transverse sections taken along corresponding lines indicated in FIG. 3.
Figure 5:
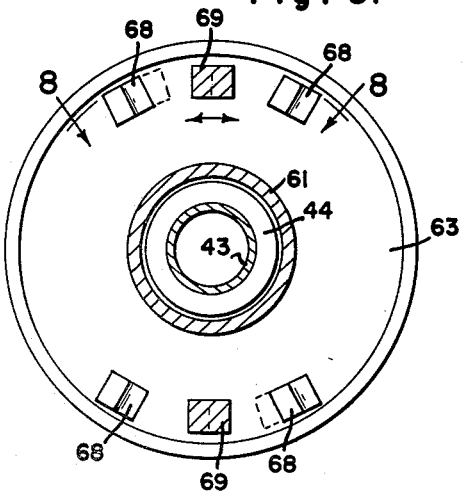
Figure 8:
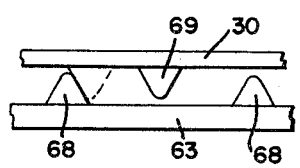
FIG. 8 is a fragmentary view as shown by line 8—8 of FIG. 5.

Within zero adjusting nut 34 is an annular piston 63 which slides in an axial direction within the recess 64 or cylinder of zero adjustment nut 34. The contact between the inner and outer edges of the piston 63 with the adjacent surfaces of hollow nut 34 is fairly tight so that piston functions as a dashpot. A plurality of springs 66 bias piston 63 toward the right. A plurality of enlarged head pins 67 threaded to nut 34 by screws 68 prevent relative rotation of piston 63 and nut 34, but permit the axial movement heretofore described. The right-hand surface of piston 63 is provided with a plurality of cams 68 having slanted forward and rearward surfaces, there being two arcuately spaced pairs of such cams 68 (FIG. 5). Cams 68 are engaged by corresponding intermediate cam members 69 on the left end of casing 30, there being a substantial arcuate distance betewen pairs of cams 68 as shown in FIGS. 4 and 5 and hence when collet 36 has turned a substantial distance relative to casing 30, cams 69 engages one of cams 68 at the limit of the movement and by reason of the slanted surfaces of the cams, piston 63 is forced away from casing 30 against the force of springs 66 and against the dashpot effect of piston 63 sliding in cylinder 64. Thus, the shock of transient relative movement of the driving and driven members, particularly on starting and stopping, is partially overcome. When a balance between the driving and driven members is regained, piston 63 moves toward casing 30 under the force of springs 66, but such movement is slowed by the dashpot effect.

Casing 30 is hollow and contains therein helical spring 54, preferably having a square cross section. As has heretofore been described, spring 54 at its center is connected by means of screws 71 and fitting 72 to radial arm 52 on outer sleeve 51. Either end of the spring 54 is connected by intermediate members to casing 30 and thus the torque applied by shaft 13 and resisted by spring 54 is measured by the relative movement of the collet 39 and casing 30 as indicated by pointer 33 on zero adjusting nut 34 and scale 31 on casing 30. Because the spring 54 is secured to the driving member at the center and to the driven member at either end, the spring to one side of arm 52 is compressed and to the opposite side is expanded depending upon the direction of rotation, thereby counterbalancing centrifugal force.

Turning now to the details of construction, it will be seen that a left-hand spring retaining annular collar 73 is secured to casing 30 by means of plate 74 and screws 76, and that a bearing 77 is interposed between spring retaining collar 73 and sleeve 51. At the right-hand end, right-hand spring retaining collar 78 is fixed to tapered end 27 on the right-hand end of casing 30 by means of screws 79. Bearing 81 is interposed between inner sleeve 36 and spring retainer collar 78.

Figure 6:
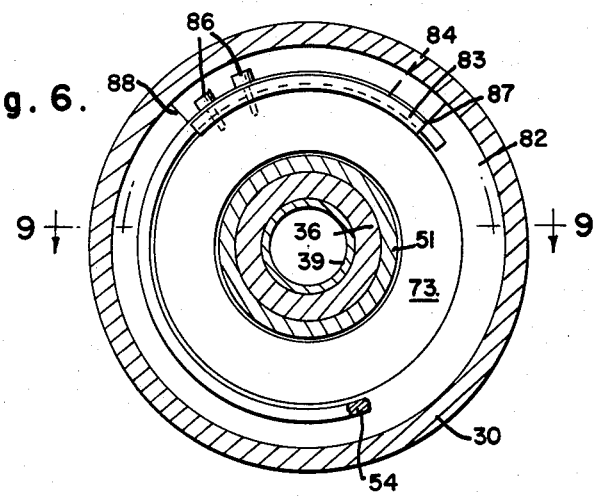
Figure 9:
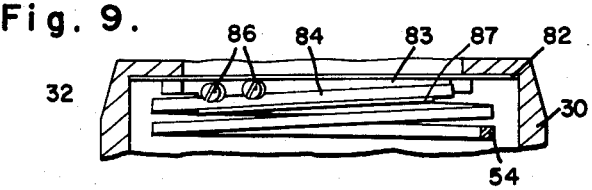
FIG. 9 is a fragmentary section along line 9—9 of FIG. 6.

As shown in FIGS. 6 and 9, spring retainer collar 73 has an enlarged end 82 which fills the bottom of hollow casing 30 and centers the collar 73 relative to casing 30. Inwardly of end 82 is a radial boss 83 formed with a helical groove 84 having a cross-sectional shape complementary to the cross section of spring 54. Fillister head screws 86 are threaded radially into boss 83 and the depth of groove 84 is such that the head of the screw 86 bears against spring 54 when it is in position in groove 84 and locks the spring in place. The effective length of spring 54 may be adjusted or, in other words, the device may be calibrated by loosening screws 86 and winding or unwinding the spring 54 in groove 84 and then retightening screws 86. For proper operation of the device the spring 54 should be accurately positioned relative to shaft 13 and for this purpose the surface 87 of retainer 73 against which the edge of the spring bears conforms to the helical shape of the spring, but the spring may expand and contract radially relative to the shaft 13 without interference. Boss 83 is terminated at reference numeral 88, so that the spring is free for a pre-determined length. The retainer 78 at the right-hand end as viewed in FIG. 3 has a shape similar to that of the left-hand retainer, particularly insofar as groove 84, boss 83 and screws 86 are concerned; similar reference numerals are applied to substantially corresponding parts.

In the form of the invention shown in FIGS. 1 and 3, the end piece 27 of the casing 30 has a slanted surface 26 similar to the slope of a V-belt pulley and has a threaded nose 29. Threaded onto the nose is the plate 28 which comprises the other half of the pulley member and by turning the right-hand half 28 toward or away from the end piece 27, the effective diameter of the pulley may be adjusted. End piece 28 may be retained in position as by means of a lock nut 91 or, preferably, by means of a set screw 92 which bears against a plastic plug 93, which in turn bears against nose 29, or both such means.

Figure 10:
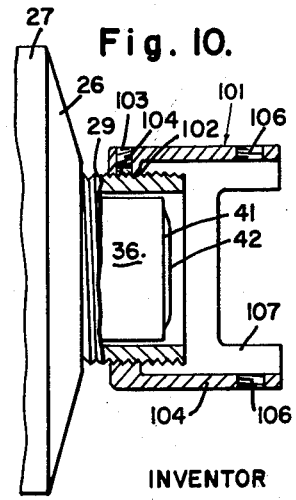
FIG. 10 is a fragmentary side elevation, partly broken away in sections, of a modification.

In the modification shown in FIG. 10, the pulley plate 28 is removed and a fitting 101 is attached to nose 29 by means of threaded neck 102 which screws onto nose 29 and is held in place by set screw 103 and plug 104. Fitting 101 may be used for direct connection to the driven member and hence is formed with an elongated collar 104 which may fit over the end of the shaft on driven member and be secured thereto by means of set screws (not shown) in tapped holes 106. Further, the fitting 101 may be cut out in axial slots 107 for connection to spokes on a hub on the driven member. Various alternative means of connection to the driven member may be used, such as sprockets, gears and the like.

In operation, a suitable collet 39 is used for the shaft 13 of the driving member and placed in position, nut 46 being loosened. The collet 39 is then slipped over the drive shaft 13 and tightened by means of nut 46. The casing 30 is connected to the driven member. In the form shown in FIGS. 1 to 9, inclusive, a V-belt 14 is interposed between end piece 26 and plate 28, the plate 28 being adjusted in position for the proper diameter of the pulley. As has heretofore been explained, other means of connection of casing 30 to the driven member may be used. Preliminarily, the pointer 33 has been adjusted to zero position as heretofore explained. The device being secured in place and properly calibrated and zero adjusted, the motor 11 is started. The initial surge is overcome by cam 69 contacting one of the cams 68, thereby causing piston 63 to be depressed against the force of springs 66, which in turn tends to overcome some of the surge. In so doing, all the tangential force exerted by cams 68, 69 is transmitted between casing 30 and collet 39 without distrubing the frictional gripping connection between zero adjustment nut neck 47 and outer sleeve 51. Unless the forces involved are sufficient to shear screws 62, no damage to the sensitive indicating elements can occur. When the surge has been absorbed, piston 63 is restored to proper position and thereupon the driving member and driven member rotate at the same speed. However, the torque is resisted by spring 54, the spring on one side of radial arm 52 expanding and on the opposite side contracting and thus there is a relative movement of zero adjusting nut 34 (and in fact the entire driving member) relative to the casing (and in fact the entire driven member). Stroboscope 18 is adjusted for the speed of rotation of the dynamometer by control 21, and when so adjusted its speed of rotation is noted as on dial 22. Further, the stroboscopic beam producing means 19 is directed to the scale 31 on casing 30 and a reading of pointer 33 on scale 31 obtained, thereby indicating the torque.

In the foregoing description and the accompanying drawings the device is used in normal manner—i.e., in a speed reducing drive wherein the dynamometer is installed on the faster running shaft and thus covering a wider power range. However, it will be understood that the device could be installed on the driven member. Hence, in the accompanying claims the terms "driving" and "driven" are used in the sense of normal installation but should be interpreted as covering the reverse situation.

It will be noted that spring 54 is shown attached by means heretofore described at either end to casing 30 and in the middle ot arm 52 which rotates with the inner or driving member. It should be understood, however, that the ends of spring 54 could be connected to collars 73 and these in turn connected to sleeve 51 or to sleeve 36, while the middle of spring 54 could be attached to the driven member or casing 30. Hence, where in the appended claims it is recited that the ends of the spring are connected to the casing and the middle of the spring to the driving member (or one of its elements, such as the other sleeve) or first rotatable member, a reverse arrangement could be employed. The claim should be interpreted to include such reverse arrangement.

What is claimed is:

1. A dynamometer comprising a first rotatable member, first means for securing said first rotatable member to a shaft, a rotable casing at least partially enclosing said first rotatable member, second means for drivingly connecting said casing to a second rotatable member, a helical spring inside said casing and connected at each end to said casing, an arm on said first rotatable member, third means for connecting said arm to the middle of said spring, and cooperating scale and pointer means on said casing and said first rotatable member to measure the angular deflection of said casing and said first rotatable member resisted by said spring.

2. A dynamometer according to claim 1, in which said first rotatable member comprises a zero-adjusting nut, carrying one of said cooperating means, fastening means for tightening said nut to said first means, and an outer sleeve to which said arm is connected, said nut frictionally engaging said outer sleeve for rotation therewith when said fastening means are tightened and permitting relative angular movement of said cooperating means when said fastening means are loosened.

3. A dynameter according to claim 2, in which said nut comprises an annular cylinder and which further comprises a piston in said cylinder, resilient means biasing said piston toward said casing and second cooperating means on said piston and casing for moving said piston away from said casing against said resilient means upon relative angular movement of said casing and said first rotatable member.

4. A dynamometer according to claim 3, in which said piston has a relatively tight fit in said cylinder whereby said piston and cylinder comprise a dashpot.

5. A dynamometer comprising an inner sleeve, a collet cooperable with said inner sleeve and fitting inside said inner sleeve, means for tightening said collet, an outer sleeve around said inner sleeve, connecting means for connecting said collet and sleeves for rotary movement together, a casing around said outer sleeve, means for connecting said casing to power transmitting means, a resilient member inside said casing and connected at either end to said casing, means connecting the midpoint of said resilient member to said outer sleeve, and cooperating scale and pointer means on said casing and one of said sleeves and connecting means for measuring the angular deflection of said casing and said collet as resisted by said resilient member.

6. A dynamometer comprising an inner sleeve, a collet cooperable with said inner sleeve and fitting inside said inner sleeve, means for tightening said collet, an outer sleeve around said inner sleeve, a zero-adjusting nut, fastening means connecting said nut to said inner sleeve, said nut frictionally engaging said outer sleeve when said fastening means are tightened for connecting said collet, sleeves and nut for rotation together, a casing around said outer sleeve, a resilient member inside said casing, end fastening means connecting each end of said resilient member to said casing, means connecting the midpoint of said resilient member to said outer sleeve, and cooperating scale and pointer means on said casing and said nut for measuring the angular deflection of said casing and said collet as resisted by said resilient member.

7. A dynamometer according to claim 6, in which each said end fastening means comprises an end piece, means securing said end piece to said casing, and second fastening means securing said resilient means to said end piece in a plurality of adjusted positions whereby said dynamometer may be calibrated.

8. A dynamometer according to claim 7, in which each end piece has a boss in which said second fastening means is received, said boss being formed with a helical groove receiving an end of said resilient means.

9. A dynamometer comprising an inner sleeve, a collet cooperable with said inner sleeve and fitting inside said inner sleeve, means for tightening said collet, an outer sleeve around said inner sleeve, a zero-adjusting nut, fastening means connecting said nut to said inner sleeve, said nut frictionally engaging said outer sleeve when said fastening means are tightened for connecting said collet, sleeves and nut for rotation together, a casing around said outer sleeve, a resilient member inside said casing, end fastening means connecting each end of said resilient member to said casing, means connecting the midpoint of said resilient member to said outer sleeve, and cooperating scale and pointer means on said casing and said nut for measuring the angular deflection of said casing and said collet as resisted by said resilient member, said nut being formed with an annular cylinder, an annular piston slidable in an axial direction in said cylinder, resilient means biasing said piston toward said casing, cooperable cam means on said casing and piston operable upon relative rotation of said piston and said casing to move said piston away from said casing against the force of said resilient means, and means to hold said piston against rotation relative to said nut.

10. A dynamometer comprising an inner sleeve, a collet cooperable with said inner sleeve and fitting inside said inner sleeve, means for tightening said collet, an outer sleeve around said inner sleeve, connecting means for connecting said collet and sleeves for rotary movement together, a casing around said outer sleeve, means for connecting said casing to a driven member, a resilient member inside said casing and connected at either end to said casing, means connecting the midpoint of said resilient member to said outer sleeve, and cooperating scale and pointer means, one of said last mentioned means being said casing and the other of said last mentioned means being responsive to movement of one of said sleeves and connecting means relative to said casing for measuring the angular deflection of said casing and said collet as resisted by said resilient member, said casing having a tapered end and a plate having a cooperating tapered side facing said end and threaded onto said tapered end.

11. A dynamometer according to claim 2, which further comprises resilient means interconnecting said nut and casing with a lost-motion fit, whereby said nut and said casing are coupled for rotation together with an angular interval of movement of said nut prior to transmission of movement of said casing.

12. A dynamometer according to claim 2, which further comprises resilient means interconnecting said nut and casing to rotate said nut and casing together after limited free relative angular movement of said nut and said casing.

13. A dynamometer comprising a first rotatable member, first means for securing said first rotatable member to a shaft, a rotatable casing at least partially enclosing said first rotatable member, second means for drivingly connecting said casing to a second rotatable member, a helical spring inside said casing, third means connected to the interior of said casing, fourth means connected to said first rotatable member, fifth means for connecting one of said third and fourth means to the middle of said spring, sixth means for connecting the other of said third and fourth means to both ends of said spring, and cooperating scale and pointer means on said casing and said first rotatable member to measure the angular deflection of said casing and said first rotatable member resisted by said spring.

References Cited in the file of this patent
UNITED STATES PATENTS

| | | |
|---|---|---|
| 839,803 | Amsler | Jan. 1, 1907 |
| 1,204,292 | McCormick | Nov. 7, 1916 |
| 1,775,076 | Watson et al. | Sept. 2, 1930 |